United States Patent [19]

Woltermann

[11] Patent Number: 4,662,271

[45] Date of Patent: May 5, 1987

[54] MACHINE FOR PREPARING HOT BEVERAGES, WITH A METERED WITHDRAWAL OF LIQUID

[76] Inventor: Erich H. Woltermann, Lubbecker Str. 240, 4950 Minden, Fed. Rep. of Germany

[21] Appl. No.: 784,207

[22] Filed: Oct. 4, 1985

[30] Foreign Application Priority Data

Oct. 9, 1984 [DE] Fed. Rep. of Germany ....... 3436984

[51] Int. Cl.⁴ .............................................. A47J 31/00
[52] U.S. Cl. ........................................ 99/299; 99/295; 99/300; 141/18; 251/65
[58] Field of Search .................. 99/295, 299, 300, 304, 99/305, 307, 302 R, 316; 141/192, 346–360, 18, DIG. 1; 222/146.5, 146.1; 251/65; 426/433

[56] References Cited

U.S. PATENT DOCUMENTS

| | | | |
|---|---|---|---|
| 3,212,539 | 10/1965 | Felix | 251/65 |
| 3,609,425 | 9/1971 | Sheridan | 251/65 |
| 4,133,354 | 1/1979 | Lerner | 99/300 |
| 4,192,227 | 3/1980 | Petry | 99/300 |
| 4,467,707 | 8/1984 | Amiot | 99/295 |
| 4,481,389 | 11/1984 | Johnson | 251/65 |

Primary Examiner—Robert W. Jenkins
Attorney, Agent, or Firm—Goodman & Teitelbaum

[57] ABSTRACT

A machine for preparing hot beverages such as coffee or tea or the like and comprising a casing having a water vessel, a heating element and a delivery line with spout. The water vessel (6) has a bottom opening (18), which is closable by a valve (19), disposed near a tray (25) receiving a predetermined metered volume and is in other respects closed in airtight fashion, and the maximum filling level (Y—Y) in the tray (25), such level corresponding to said volume, is disposed in the plane of the opening (18), the valve (19) being in the closed state and the heating element (27) heating the said volume.

11 Claims, 4 Drawing Figures

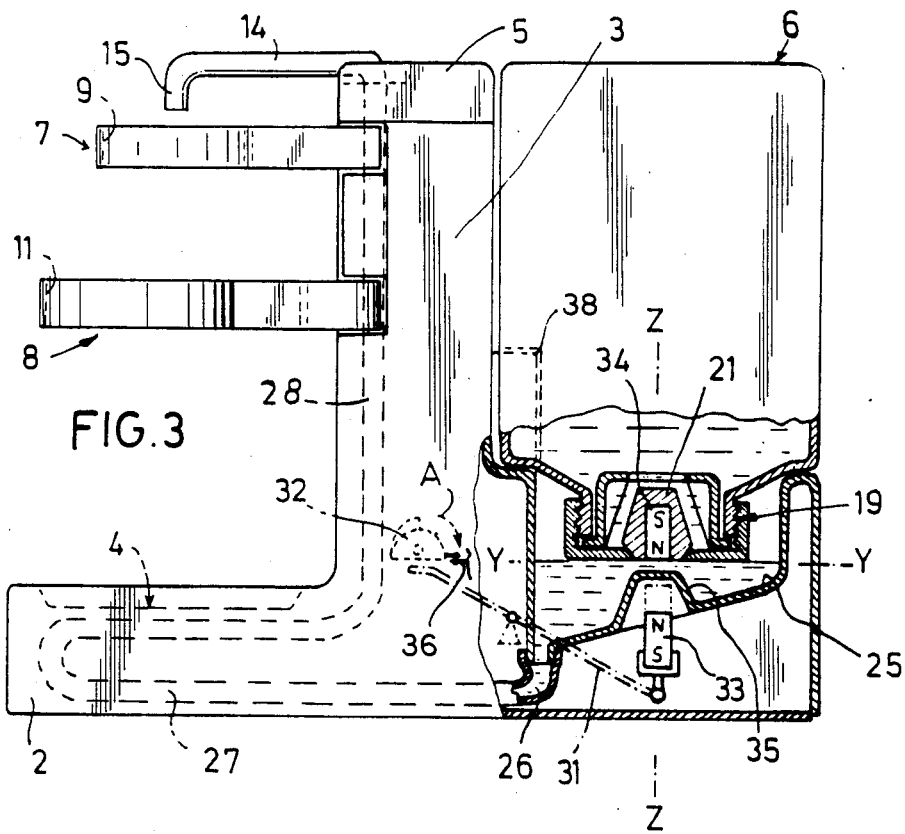
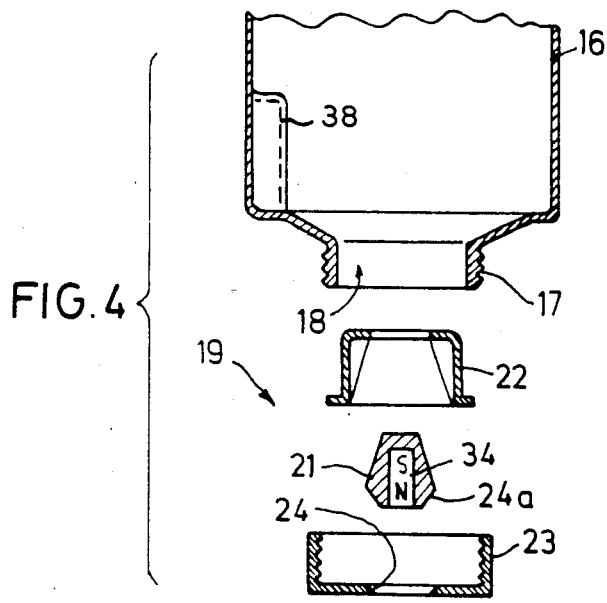

MACHINE FOR PREPARING HOT BEVERAGES, WITH A METERED WITHDRAWAL OF LIQUID

This invention relates to a machine for preparing hot beverages such as coffee or tea or the like and comprising a casing having a water vessel, a heating element and a delivery line with spout.

Machines of this kind are common. Their water vessels are filled with a predetermined quantity of fresh water, whereafter all the water in the vessel is heated and goes, for example, into a coffee filter filled with coffee powder in order to prepare coffee. If it is required to withdraw only a quite specific quantity of liquid, for example, just to prepare a single cup of coffee, either the vessel must be filled only in accordance with the required quantity of coffee or the machine must be switched off in good time. Switching off in good time is virtually impossible since some hot water continues to flow after the heater has been switched off. Consequently, if a specific quantity of liquid is to be prepared in the known machines, the only way of doing so is to fill the water vessel with the required quantity. However, this makes for very elaborate and inconvenient handling.

This invention solves the problem of providing a machine of the kind hereinbefore set out in which the water vessel is filled just once, whereafter a metered quantity of liquid can be withdrawn repeatedly over a period of time, the aim also being to provide a simple and easy-to-service construction.

According to the invention, therefore, the water vessel has a bottom opening, which is closable by a valve, disposed near a tray receiving a predetermined metered volume and is in other respects closed in airtight fashion, and the maximum filling level in the tray, such level corresponding to said volume, is disposed in the plane of the opening, the valve being in the closed state and the heating element heating the said volume. Preferably, the heating element is an instantaneous heater and communicates with the tray by way of a connecting line, and the tray, connecting line, heater and delivery line intercommunicate with one another on the communicating vessels principle. This feature ensures that when the valve opens liquid is removed from the water vessel only until the water level in the metering tray has reached the maximum filling level; once the same has been reached, the access of air to the water vessel is interrupted so that water cannot continue to discharge from the bottom of the water vessel. Since the tray together with the connected lines and the heater contain exactly the required quantity at the maximum filling level, opening of the valve ensures automatic metering. According to the invention, therefore, a single actuation suffices to dispense a quantity of liquid, for instance, sufficient for a cup of a beverage, without water, filter and extract, such as powdered coffee, having to be supplied and metered or dispensed by the person using the machine. The machine according to the invention therefore has a wide variety of uses, more particularly since operation is very simple, requiring the use of just a single actuating lever. The machine according to the invention is of use, for example, in self-service hotel rooms, consultation rooms, caravans, boats and even lorries.

Other advantageous of the invention are set out below.

The invention will be described in greater detail hereinafter with reference to the embodiments shown in the accompanying drawings wherein:

FIG. 3 is a side elevational view similar to FIG. 2, showing parts thereof in section; and FIG. 4 is a section through the water vessel of the machine of FIG. 1 and shows the vessel broken down into its discrete components.

Figure 1:
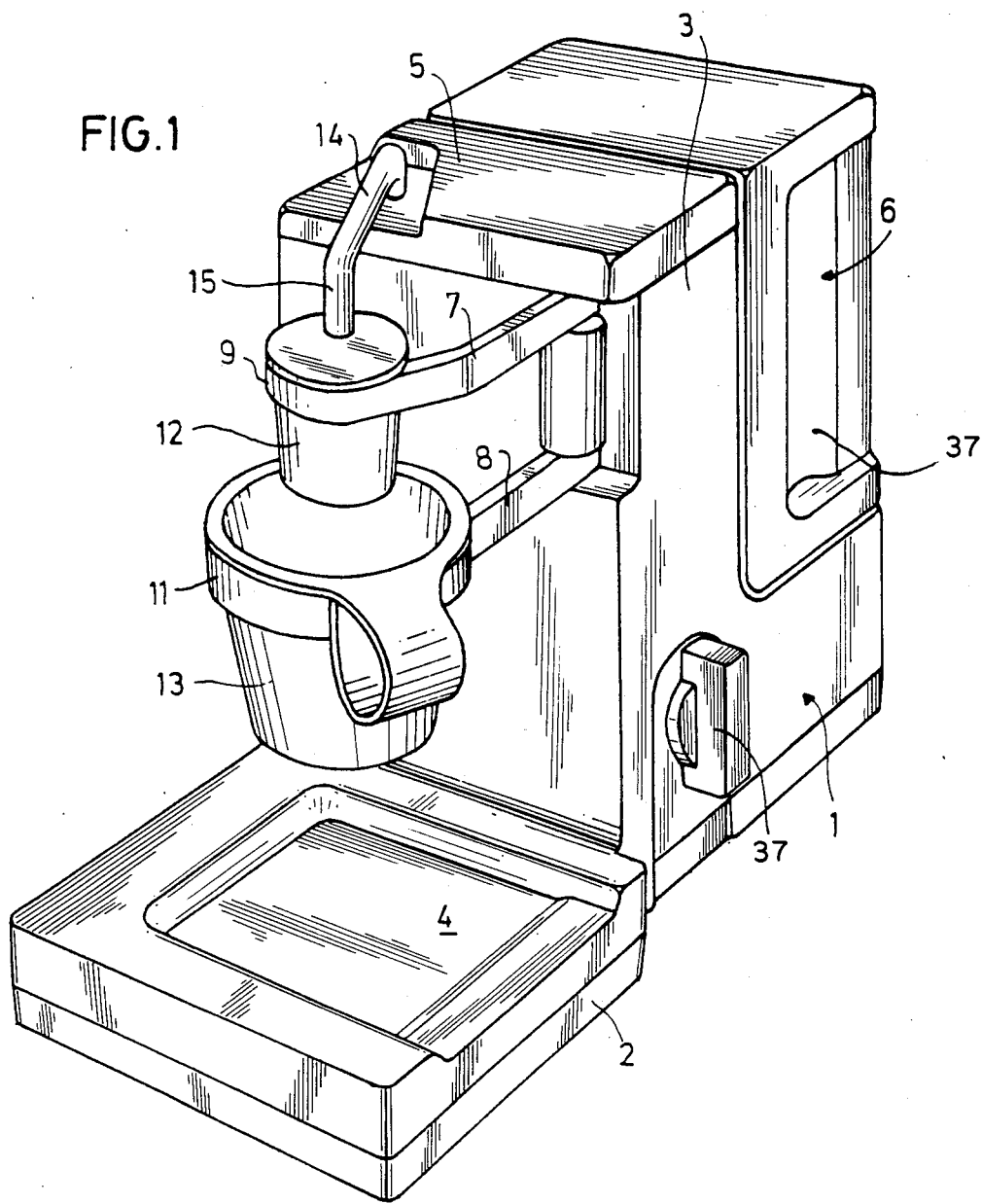
FIG. 1 is a perspective view of a machine according to the invention.
Figure 2:
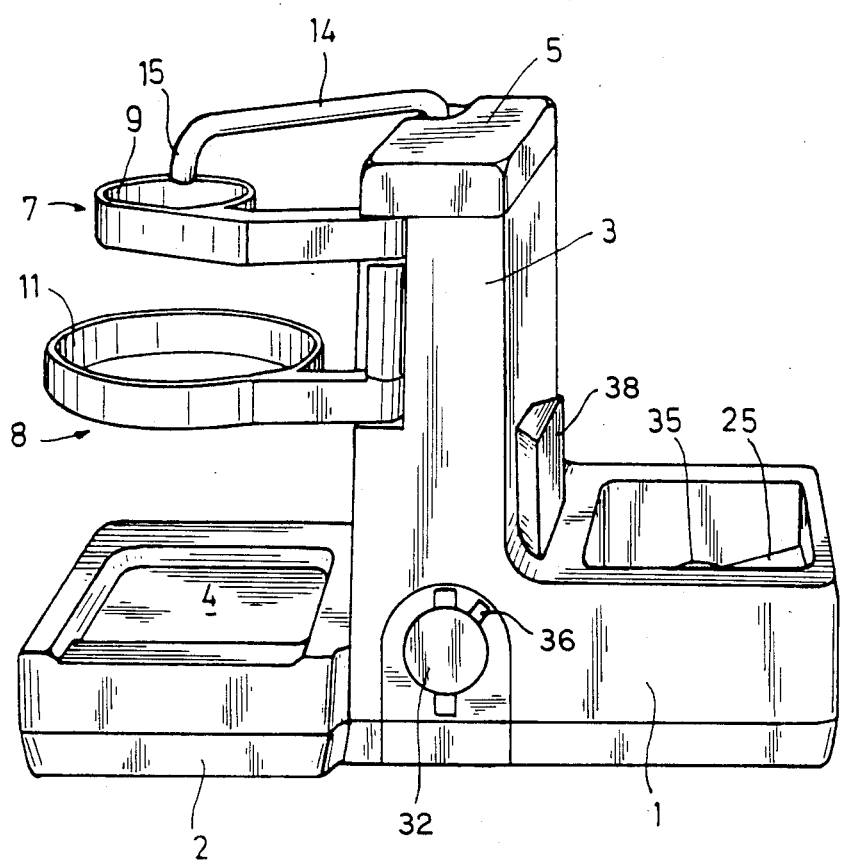
FIG. 2 is a side view of the machine of FIG. 1 without water vessel.

As can be gathered from FIG. 1, a machine according to the invention for preparing hot beverages, more particularly coffee, comprises a preferably plastics casing 1. The same has a base 2, a substantially L-section central part 3 of the casing, a drip tray 4 in the base 2 and a casing cover 5 which closes the vertical arm of the part 3 at the top. A water vessel 6 is releasably disposed on the horizontal arm of the L-shaped part 3. Two arms 7, 8 disposed one above another are pivotably mounted on the part 3 on that side of the vertical arm of the part 3 which is opposite the vessel 6. The arms 7, 8 have retaining rings 9, 11 which extend around receiving apertures. The diameter of the ring 9 is such that the same can receive a coffee filter 12 (see FIG. 1), while the ring 11 has an aperture adapted to receive and retain a cup 13 or similar vessel. The two arms 7, 8 are so devised that, when they are in the operative position shown in FIG. 1, the vertical central axes of the apertures of the rings 9, 11 coincide with one another. The arms 7, 8 can be pivoted separately from one another so that the filter 12 or the vessel 13 can be introduced downwardly into the apertures of the rings without hindrance. Extending from the cover 5 is a tubular spout 14 having at its free end a right-angled bend 15 whose discharge orifice is disposed exactly on the central axis of the rings 9, 11 when they are pivoted to be one above another (see FIG. 1). Since the arms 7, 8 are pivoted, the spout 14 can be fixed. The scope of the invention will not be exceeded if water vessel 6, instead of being releasable as shown, is unitary with the casing 1.

As can be gathered from FIGS. 3 and 4 taken together, the water vessel 6 according to the invention comprises a receptacle part 16 which is preferably a blow moulding made of non-transparent plastics. The part 16 can have a transparent sight glass to give an external indication of the filling level. The part 16 has an externally screwthreaded spigot 17 which extends around the single aperture 18 of the part 16. A valve 19 is adapted to close the opening 18. The valve 19 preferably comprises a sealing lid or cone 21 which is guided in a cone receiver 22 introduced in the spigot 17 and which is retained externally by a screw-threaded cap 23 adapted to be screwed on to the spigot 17 and having an integral sealing seat 24, the cone 21 having a corresponding sealing seat 24a. Instead of a cone, a ball or a similar sealing element can be used. FIG. 3 shows the vessel 6 according to the invention in assembled state—i.e., with the valve 19 fitted. According to the invention, the vessel 6 is engaged by way of its opening 18 on the horizontal arm of the central part 3 of the casing; the valve 19 prevents any egress of the water in the vessel 6 when the same has been thus engaged. The vessel 6 is removed to be filled, vessel 6 being turned upside-down so that the opening 18 comes to the top and the part 16 can be filled right up with water through the then open valve 19. The filled vessel 6 is then turned the right way up; the valve 19 immediately closing the opening 18. Disposed in the horizontal arm of the part 3 below the vessel 6 is a tray 25 whose interior communicates via a line 26 with an instantaneous heater 27. The same is connected at its other end by way of a riser 28 to the spout 14. The riser 28 extends substantially through the vertical arm of the part 3 and the heater 27 is disposed in the base 2 of the casing. The interior bounded by the tray 25 including the filling volume of the connecting line, heater 27, and of a part of the riser 28 has a total volume exactly equal to a quite specific metered or dispensed volume. According to the invention, this volume can be accurately adapted to the content of the vessel 13, so that the machine according to the invention always heats up and provides a filling of exactly the volume required for the content of the vessel 13. Operation according to the invention is as follows. The water-filled vessel 6 is placed on the part 3 with its opening 18 at the bottom. In this state the valve 19 closes the opening 18. The valve opening is disposed immediately above the tray 25, the same being closed at the top by the water vessel 6 placed on it. The plane in which the valve opening is disposed determines the filling level of the tray 25. This filling level—i.e., the maximum filling level—is indicated by a line Y—Y in FIG. 3. When the valve opens by the cone 21 moving upwards—i.e., into the vessel 6—an annular gap opens in the valve 19 and the water in the vessel 6 can flow through such gap so that the water descends. The vessel 6 is so devised that there can be no additional removal or introduction of air from or into the vessel 6. The descending water flows into the tray 25 and into the connected lines including the heater. When the quantity of liquid rises in the tray 25 as high as the level Y—Y and therefore as high as the valve seat—i.e., the opening 18 to be closed by the valve—the entry of air into the vessel 6 is stopped. Consequently, water cannot continue to discharge from the vessel 6 so that a quite specific predetermined quantity is removed therefrom. This quantity corresponds, for example, to the quantity of liquid which can be received by the vessel 13. After the required quantity has discharged, the valve 19 recloses so that no more water can issue from the vessel 6. As the dispensed quantity fills up, the heater switches on and heats the water in the tray 25, the water discharging when heated through the riser 28 and spout 14 until the tray 25 is completely empty. To this end, the line 26 is, conveniently, connected to a very low part of the tray 25 so that the same has a base descending in a slight gradient to the lowest point. Because of the arrangement according to the invention, the tray 25 with its interior, the pipe 26, the heater 27 and the riser 28 form a unit operating on the principle of communicating vessels. The water output by the heater is preferably at a temperature from 92° to 96° C.

According to the invention, the valve 19 is, conveniently, actuated by way of linkage 31. The same is connected at one end to a rotatable knob 32 and at the other end to a magnet 33. The same is a permanent magnet with its polarity so aligned that one of its two poles extends towards the valve 19, i.e. towards the cone 21; conveniently, the central axis Z—Z of the e.g. bar magnet 33 coincides with the central axis of the cone 21. The same also has a permanent magnet 34 so disposed that like poles of the two magnets are disposed opposite one another—i.e., if, as in the embodiment illustrated, the magnet 33 has its north pole at its end near the valve, the magnet 34 also has its north pole at its end near the magnet 33. Rotation of the knob 32, for example, in the direction indicated by an arrow A, by means of the linkage 31 moves the magnet 33 along the axis Z—Z towards the cone 21; an appropriate frustum-shaped bulge 35 in the tray 25 ensures that the magnet 33 can be moved very close to the cone 21. Since like poles repel one another and the magnet 33 connected to the linkage 31 cannot move, the magnetic force raises the cone 21 in the valve 19 so that an annular gap through which the water in the vessel 6 can flow opens in the valve. Further rotation of knob 32 lowers the magnet 33 so that the water pressure acting on the cone 21 closes the valve 19 automatically. The rotary travel of the knob 32 and, therefore, the open time of the valve 19 is such as to ensure that sufficient water can discharge from the vessel 6 to completely fill the tray 25 up to the level Y—Y. The magnetic opening of the valve virtually embodies an indirect actuation of the valve in accordance with the invention, with the advantage that no operating elements are present in the user-accessible zone of the tray, which needs occasional cleaning. This feature also precludes leaks in this region.

Actuation of the knob—i.e., the actuation of the lever 32—not only opens and closes the valve 19 but also switches on the heater 27. The knob-actuated heater switch 36 is, conveniently, also devised to provide low-water cut-out and temperature protection and is, for example, in the form of a bimetallic switching element. With the heater on, water is delivered until the entire metered volume has been emptied from the tray. The absence of water in the heater near the end of the delivery causes such a steep rise in the casing temperature near the heater that the bimetallic switch trips and thus switches off the heater.

According to the invention, therefore, the temperature protection feature serves both as a make switch and a break switch for the heater.

As can be gathered from FIG. 1, the water vessel 6 has on its outside grip recesses 37 and, as can be seen in FIG. 4, has in the zone near the central part 3 a dovetail guide 38 to ensure reliable retention of the vessel 6 on the casing 1.

The volume which the tray 25 can contain can be adjusted subsequently, for example, by the provision of diaphragm elements inside the tray over a specific width so that accurate calibration is possible.

Conveniently, since the machine according to the invention can heat and deliver an accurately metered quantity of liquid per switch-on, the filter 12 contains a quantity of, for example, powdered coffee accurately adapted to the metered volume. This can readily be achieved, for example, by means of known correspondingly portioned coffee packs which are disposed in the filter and can form a unit therewith.

According to another feature of the invention, the machine according to the invention can have a magazine or store containing a number of coffee portions with integrated filter. The magazine is disposed below the spout 14 and can be, for example, in ring or strip form. Individual packs can also be used; in this case, according to the invention the magazine moves on one step at each actuation of the lever 32 in addition to the functions hereinbefore described. The magazine can be charged or introduced either downwardly or by a lateral rack; in this case, according to another feature the actuation and starting of the dispensing or metering operation and the heating and delivery of water is blocked once the last insert in the magazine has been consumed, thus ensuring that hot water alone cannot be delivered.

The invention is not limited to the embodiment described but comprises all equivalent means; for instance, the actuating device to open the valve can comprise a linkage which extends as far as the valve and is connected thereto for opening and closing; a ball seat can be provided in the valve.

I claim:

1. A machine for preparing hot beverages such as coffee, tea and the like, comprising:

a casing (1) having a water vessel (6);

said casing (1) being provided with a tray (25);

a bottom opening (18) of said water vessel (6) being disposed near said tray (25) so that said tray (25) can receive a predetermined metered volume of liquid from said water vessel (6), said tray (25) in other respects being closed in an airtight fashion;

a valve (19) having a closed state for closing said bottom opening (18), and having an open state for opening said bottom opening (18) to permit said liquid to flow from said water vessel (6) into said tray (25);

said bottom opening (18) being disposed in a predetermined plane so that said plane defines a maximum filling level (Y—Y) of said liquid in said tray (25) when said valve (19) is in said open state, where said liquid filled to said maximum filling level (Y—Y) prevents air from entering into said water vessel (6) and thus stops said liquid from flowing into said tray (25), said maximum filling level (Y—Y) determines said predetermined metered volume of liquid received by said tray (25);

a heating element (27) in said casing (1) for heating said predetermined metered volume of liquid, said heating element (27) being an instantaneous heater;

a connecting line (26) connecting said heater (27) to said tray (25), and said heater (27) being connected to a delivery line (28) provided with a spout (14) so that said tray (25), connecting line (26), heater (27), deliver line (28) and spout (14) are in flow communication with one another.

2. A machine according to claim 1, characterised in that a sealing lid (21) of the valve (19) is moved magnetically to open the valve.

3. A machine according to claim 2, characterised in that a first magnet (34) is disposed in the sealing lid (21) and a second magnet (33) is so disposed opposite the first magnet (34) for movement in the casing (1) outside the tray (25) that like poles of the two magnets (33, 34) are near one another and the second magnet (33) is movable towards and away from the sealing lid (21) by means of an actuating mechanism (31, 32).

4. A machine according to claim 3, characterised in that the actuating mechanism comprises linkage (31) and, acting on one end thereof, an actuating lever (32), more particularly a rotatable knob, and a linkage end opposite such knob is connected to the second magnet (33).

5. A machine according to claim 4, characterised in that an electrical switch for switching the heater on and off can be actuated by the knob actuating lever (32).

6. A machine according to claim 5, characterised in that the on/off switch is a temperature-dependent bimetallic switch.

7. A machine according to claim 3, characterised in that the tray (25) has a bulge (35) which ends immediately below the valve (19) of the water vessel (6) for movement of the second magnet (33).

8. A machine according to claim 1, characterised in that the water vessel (6) comprises a receptacle part (16) having an externally screwthreaded spigot (17) around the opening (18), the spigot (17) receiving a guide holder, more particularly a cone holder (22), in which a valve lid, in the form of a sealing cone (21), is guided and can be screwed on to the screwthreaded spigot by a cap (23) having on its inside a sealing seat (24) corresponding to a sealing seat (24a) of the sealing cone (21).

9. A machine according to claim 1, characterised in that the water vessel (6) is releasably secured to the casing (1) and when thus secured closes the tray (25).

10. A machine according to claim 1, characterised in that arms (7, 8) are pivotally disposed one above another on a casing side opposite the water vessel (6) and have retaining rings (9, 11) to receive a filter insert and a receiver, with central axes of the rings coinciding with one another in an operative position.

11. A machine according to claim 10, characterised in that the spout (14) is fixedly disposed and its discharge orifice is disposed centrally above the rings (9, 11) when the same are in their operative position.

* * * * *